April 24, 1956 M. L. SHARRAH 2,743,304
METHOD OF PREPARING WAX SUBSTITUTED AROMATIC HYDROCARBONS
BY REACTING A CHLOROWAX WITH THE AROMATIC, WHEREIN TWO
GRAM ATOMS OF CHLORINE ARE ADDED PER MOLE OF AROMATIC
AND THE TEMPERATURE IS MAINTAINED BELOW 100° C.
Filed May 2, 1952
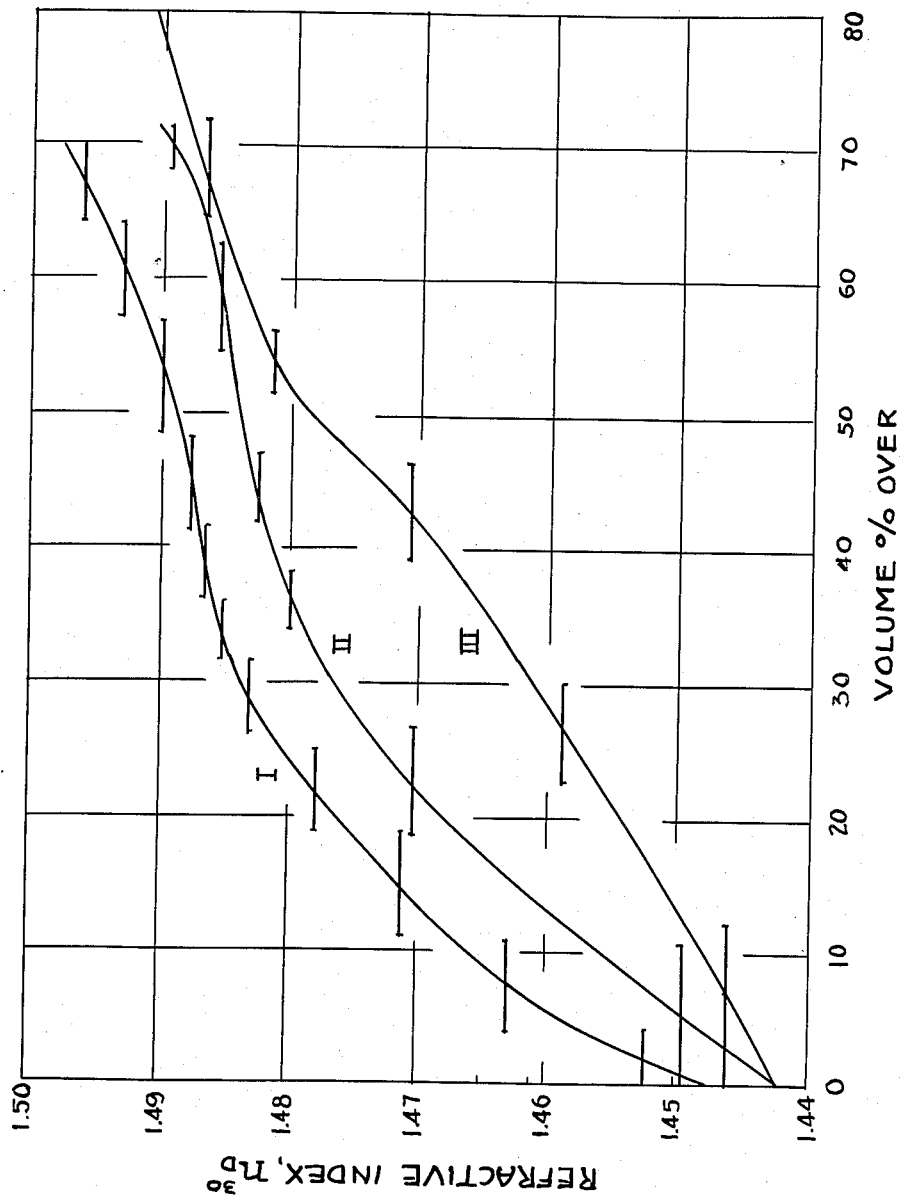
*INVENTOR.*
MARION L. SHARRAH
BY
Oberlin & Limbach
ATTORNEYS.

United States Patent Office 2,743,304
Patented Apr. 24, 1956

2,743,304

METHOD OF PREPARING WAX SUBSTITUTED AROMATIC HYDROCARBONS BY REACTING A CHLOROWAX WITH THE AROMATIC, WHEREIN TWO GRAM ATOMS OF CHLORINE ARE ADDED PER MOLE OF AROMATIC AND THE TEMPERATURE IS MAINTAINED BELOW 100° C.

Marion L. Sharrah, Ponca City, Okla., assignor to Continental Oil Company, Ponca City, Okla., a corporation of Delaware Application May 2, 1952, Serial No. 285,633

20 Claims. (Cl. 260—671)

This invention relates to improvements in the alkylation of relatively volatile aromatic hydrocarbons with high molecular weight alkyl halides.

More particularly, my invention is concerned with improvements in the Friedel-Crafts alkylation of volatile single ring aromatic hydrocarbons having boiling points below about 125° C., such as benzene and toluene, with alkyl chlorides of about 18 to 30 carbon atoms which are liquid at 125° C.

An object of my invention is to provide a simplified process for producing alkylbenzenoid intermediates improved both in structure and physical properties particularly for the production of oil soluble sulfonates therefrom. Another object is to produce alkaryl intermediates for conversion to surface active sulfonates which are particularly adapted for service in lubricating compositions. These and other objects of the invention will become apparent from the description given hereinafter.

The Friedel-Crafts procedure for alkylating aromatic compounds with alkyl halides in the presence of anhydrous aluminum chloride is generally known and has been practiced to secure products useful in a wide variety of ways. For example, sulfonate salts have been produced from aromatic alkylates to provide surface-active agents for use in both aqueous and non-aqueous systems depending on the nature of the alkylating agent used. The present invention is concerned with high molecular weight aromatic alkylates useful for the production of oil soluble sulfonates.

Prior workers have produced such alkyl aromatic intermediates, for example, an alkyl benzene referred to as diwaxbenzene. The generally practiced procedure for producing it consists of a two-stage Friedel-Crafts alkylation process. In the first stage, benzene is alkylated with chlorinated paraffin wax in the presence of anhydrous aluminum chloride and a large excess of benzene. The temperature of the reaction is about 50–60° C. under atmospheric pressure. When this stage is completed, the excess benzene is stripped from the reaction mass by distillation at about 115° C. In a second stage, the stripped reaction mass comprising the product, termed mono-waxbenzene, is brought to about 80° C. and a second equal proportion of the chlorinated wax is added for further alkylation in the presence of the initially added catalyst. When the second stage is completed, the catalyst sludge is separated from the reaction mass to obtain the so-called diwaxbenzene alkylate. For a reference description of this procedure, see U. S. Patent No. 2,416,281, issued to Berger and Fuller on February 25, 1947.

A characteristic feature of the Friedel-Crafts alkylation is that the introduction of an initial alkyl substituent into an aromatic nucleus markedly increases the ease of further alkylation. Theoretically this would tend to form polyalkyl intermediates of which the oil soluble sulfonate derivatives were not believed to be desirable detergents, hence the use of excess benzene has been generally practiced. This Friedel-Crafts reaction, however, suffers from appreciable molecular fragmentation and disproportionation of the alkylate, particularly at the processing temperatures above 100° C. required for removing the excess unreacted aromatic material in the presence of the catalyst. The difficulties of this alkylation are even more serious and accentuated when high molecular weight alkylating agents such as the chlorinated aliphatic hydrocarbons of 18 to 30 carbon atoms are used. One disadvantage is that stripping of benzene requires a temperature above 100° C., thus promoting molecular fragmentation and disproportionation of the alkylate. It is likely that it is this latter defect which produces the undesirable results rather than the poly-alkylation that prior workers attempted to avoid. A process disadvantage is time lost in stripping excess benzene from the first stage reaction mass and such interruption of the alkylation reaction is also detrimental to desirable alkylate formation.

The higher aliphatic alkylating agents utilized herein are generally constituted of mixtures of mono-, di-, and poly-chloro compounds. The nature of the reaction between chlorine and the higher aliphatic hydrocarbons in the preparation of the alkylating agent precludes the formation of any dominantly pure compound. I believe the mixtures are more desirable for the production of the class of detergents contemplated herein, provided that (1) an optimum amount of aromatic material is combined therewith to give maximum molecular weight products, and that (2) conditions favoring reversal of the alkylation process be avoided or minimized. It will be realized from this that the prior art provided unfavorable conditions both by (1) the use of an excess of the aromatic component, and then (2) having to remove the excess in the presence of the catalyst at high temperatures favoring reversal of the process, i. e., de-alkylation of the product.

The consequences of prior practice are reflected in the disproportionately low molecular weights of the aromatic alkylates and an incomplete development of the most desirable detergent characteristics in the sulfonates produced therefrom.

I have discovered process conditions which provide a marked improvement in the properties of the alkylate by the use of a substantially stoichiometric proportion of the aromatic reactant, by reducing the severity of the alkylating conditions, and by eliminating stripping or separation operation at temperatures exceeding alkylating temperatures. I have further found that poly-alkylation is no longer a problem when reaction conditions are used which minimize the molecular fragmentation and disproportionation. I have provided a process which accomplishes the foregoing improvements, and overcomes the disadvantages of the prior art.

The accompanying drawing illustrates graphically a physical aspect of the improvements I have attained over prior art procedures.

The improved aromatic alkylates contemplated by my invention are particularly adapted for conversion to the oil soluble detergent sulfonates of the alkaline earth metals, especially of calcium and barium, and of magnesium. The aromatic nucleus therein is derived from a relatively volatile aromatic compound having a boiling point below about 125° C., such as benzene and toluene. This nucleus further is substantially di-substituted by aliphatic components. The aliphatic component may contain from about 18 to about 30 carbon atoms; it is preferably derived from the corresponding alkylating agents consisting of chlorinated aliphatic hydrocarbons. The alkylating agent generally consists of a mixture of mono-, di-, and poly-chlorinated aliphatics in which molecular distribution of chlorine preferably averages from about one to about two atoms per mole and which are liquid at temperatures below about 125° C. Specific examples of the alkylating agent include chlorinated octadecane, chlorinated waxes, etc. A preferred alkylating agent consists of a paraffin wax, say, of 24 carbon atoms, which has been chlorinated to contain about 16 per cent Cl by weight, corresponding to approximately 1.8 atoms Cl per mole.

Although anhydrous aluminum chloride is the preferred Friedel-Crafts catalyst, it is apparent that other metal halide Friedel-Crafts type catalysts may also be employed in the process of this invention. Among such other metal halides may be included zinc chloride, boron fluoride, aluminum bromide, zirconium chloride, ferric chloride, antimony chloride, bismuth chloride, and the like.

A broad embodiment of my improved alkylation process comprises reacting a chlorinated aliphatic hydrocarbon of about 18 to 30 carbon atoms with a relatively volatile aromatic hydrocarbon in substantially the proportions of 2 chlorine gram-equivalents of the chlorinated hydrocarbon to one gram mole of the aromatic hydrocarbon in the presence of anhydrous aluminum chloride under mild alkylating conditions, that is, over a period of at least one hour and at a temperature below about 100° C. At the temperature of the alkylation reaction, preferably above about 50° C. but not exceeding about 90° C., the vapor pressure of the aromatic reactant, such as benzene and toluene, is such that the evolution of hydrogen chloride in the reaction carries it out of the reaction zone in appreciable amounts. My process, therefore, includes means to compensate for vapor-lost aromatic so as to maintain substantially the essential proportioning of the reaction components.

One procedure for the practice of my invention consists as follows: A given charge of the volatile aromatic along with an appropriate amount of a metal halide Friedel-Crafts catalyst, say from about 0.02 to 0.2 mole per mole of aromatic hydrocarbon, is placed in a well agitated reactor equipped with a high efficiency outlet reflux condenser. It is apparent that greater amounts of the catalyst than are necessary to catalyze the reaction may be used in the reactor but to do so would be economically unfeasible. The charged reactor is warmed to about 50 to 60° C. The alkylating agent, such as a chlorinated wax hydrocarbon, is then added slowly at such a rate as to prevent uncontrollable evolution of hydrogen chloride. This rate will, of course, vary depending upon a variety of conditions such as the size and shape of the reaction vessel, the amounts of the reactants employed, the initial temperature of the reacting materials, and the like, but generally should be such that all of the chlorinated wax hydrocarbon is added over a period of at least one hour and not more than about 10 hours, preferably about 4 to 8 hours. During this reaction, the evolving hydrogen chloride gas carries off appreciable amounts of the vaporized aromatic component. Even though highly efficient, the reflux condensing system may not prevent reaction-important vaporization losses of this component. Knowing the loss behavior of a given apparatus, it is essential to return to the reaction zone an amount of the aromatic material corresponding to the vapor loss therefrom. This may be done conveniently after about one-half of the alkylating agent has been added. This completes the first stage of the process.

The temperature of the reaction mass may then continue at 50 to 60° C. or may be raised not to exceed about 80 to 90° C. during addition of the remaining half of the alkylating agent at a continued slow rate suitable for controlling the evolution of hydrogen chloride in relation to the reaction temperature. When the second half of the alkylating agent has been added, it may then be convenient to return any further amount of aromatic lost during this period. The second aromatic make-up is usually less than the first one.

Finally, the completed reaction mass is heat-soaked, preferably without agitation, for several hours at about 80° C. to substantially complete the alkylation, to establish molecular equilibrium, and to settle out the catalyst sludge. The alkylate product is then withdrawn from the catalyst sludge.

Another procedure for the practice of my invention consists in compensating for vaporization of the aromatic component by continuously introducing it along with the alkylating agent in an amount corresponding to the rate of vaporization loss from the reaction as follows: A given amount of the volatile aromatic hydrocarbon and an appropriate amount of Friedel-Crafts catalyst are charged to a well agitated reaction vessel equipped with a high efficiency outlet reflux condenser as in the example above. The charged reactor is warmed to about 50 to 60° C. The alkylating agent such as a chlorinated wax hydrocarbon is slowly added as in the above example at a rate such as to prevent uncontrollable evolution of hydrogen chloride. Simultaneously with the addition of the alkylating agent amounts of aromatic hydrocarbon corresponding to those vaporized and carried off by the evolving hydrogen chloride are introduced into the reaction vessel. The reaction mass is maintained during the addition of the alkylating agent and the make-up aromatic hydrocarbon at a temperature not exceeding about 80 to 90° C. The completed reaction mass is heat-soaked for several hours at a temperature below about 100° C. until the metal halide sludge has settled out and the alkylate product is withdrawn from the catalyst sludge.

Still another means to compensate for vaporization of the aromatic reactant may consist in cutting back on the quantity of alkylating agent in proportion to the vaporization loss of the aromatic reactant as follows: A reaction vessel as in the examples above is charged with a volatile aromatic hydrocarbon and a catalytic amount of a metal halide Friedel-Crafts catalyst and heated to about 50 to 60° C. The chlorinated wax hydrocarbon alkylating agent is then slowly added to the reaction vessel until the alkylating agent added and the aromatic nuclei remaining (that is, the amount of aromatic nuclei originally charged to the reaction vessel less any amount lost through vaporization and hydrogen chloride evolution) are present in relative proportions of about 2 chlorine gram-equivalents of the chlorinated hydrocarbon to each gram mole of aromatic hydrocarbon. The temperature of the reaction mass during the addition of the alkylating agent is maintained at a temperature not above about 90° C. After the usual heat-soaking period to settle out the sludge, the alkylate product is withdrawn from the catalyst sludge.

The reaction rate and evolution of hydrogen chloride may be controlled as well by means of the rate of addition of the metal halide Friedel-Crafts catalyst as follows: An agitated reactor equipped with a reflux condenser is charged with a volatile aromatic hydrocarbon and a chlorinated wax paraffin in relative proportions of about 2 chlorine gram-equivalents of the chlorinated hydrocarbon to each gram mole of aromatic hydrocarbon. This reaction mass is heated to from 50 to 60° C. and a metal halide Friedel-Crafts catalyst is slowly added over a period of from one to ten hours or preferably 4 to 8 hours, until from about 0.02 to 0.2 of a mole of metal halide has been added for each mole of aromatic hydrocarbon originally charged to the reactor, the rate of addition being such as to prevent uncontrollable hydrogen chloride evolution. The aromatic hydrocarbon lost from the reactor by vaporization and hydrogen chloride evolution may be made up by any of the above methods. The reaction mass may then be heat-soaked at a temperature below about 100° C. as in the case of the other examples and the alkylate product separated from the catalyst sludge.

For producing the improved products of my invention, I employ a quantity of alkylating agent corresponding to substantially 2 gram atoms of halogen constituent for each gram mole of the aromatic to be alkylated therewith. Where the alkylating agent is a predominantly mono-chlorinated aliphatic hydrocarbon, the proportion would be substantially equal to the stoichiometric amounts required for the production of an end product having an average of two alkyl groups per aromatic nucleus. The practical means for maintaining this proportioning in the process have just been described.

The products which I produce may be designated as alkylated aromatic hydrocarbons. These alkylated aromatic hydrocarbons are characterized essentially as mixtures comprising (1) an aromatic nucleus (benzene and toluene are so defined) plus two distinct alkyl groups, (2) the aromatic nucleus interalkylated with a polyfunctional alkyl group, and (3) various combinations of aromatic and alkyl components therebetween. This variety of molecular structures can be accounted for by the mixed chloroaliphatics which compose the alkylating agent.

The examples which follow illustrate the practice of my invention for producing improved alkylate products.

raised to 85° C. while another 1300 grams (6 moles) of the chlorowax was added during 4 hours with stirring; hydrogen chloride continued evolving from the reaction. Twenty-five grams of vapor-lost benzene were then added into the reaction mixture. The reaction mass was stirred 4 hours more at 85° C.

Completion of the process consisted in letting the reaction mass stand quiescent at a temperature not above about 100° C. over night. This permitted the alkylate product to reach final equilibrium, and the catalyst sludge to settle out.

The crude alkylate product amounting to 2230 grams was drawn off from the catalyst sludge. The physical properties of fractions from molecular distillation of this product are shown in Table I. The distillation was made on a Centrifugal Cyclic Batch Molecular Still, Type CMS-5, manufactured by Distillation Products, Incorporated.

Table I.—Molecular distillation of alkylate

| | Dist. Temp., °C. | Distillation Pressure (microns) | Fraction Time, Min. | Volume | | Weight | | Refractive Index, $n_D^{30}$ | Density, $d_4^{27}$ | Mol. Wt.[1] |
|---|---|---|---|---|---|---|---|---|---|---|
| | | | | Fraction, ml. | Cumulative, Vol. Percent Over | Fraction, Grams | Cumulative, Wt. Percent Over | | | |
| Charge to Still | | | | 830 | | 720 | | 1.4882 | 0.8679 | 614 |
| Still Fractions: | | | | | | | | | | |
| a | 120 | 8.7– 6.9 | 29 | 36 | 4.3 | 28.75 | 4.0 | 1.4524 | 0.8055 | 319 |
| b | 140 | 6.7– 5.8 | 27 | 55 | 11.0 | 44.90 | 10.2 | 1.4631 | 0.8233 | 333 |
| c | 160 | 5.8 | 25 | 65 | 18.8 | 55.10 | 17.9 | 1.4711 | 0.8379 | 378 |
| d | 180 | 5.8– 5.7 | 23 | 56 | 25.6 | 46.60 | 24.4 | 1.4779 | 0.8504 | 389 |
| e | 200 | 5.8– 6.0 | 19 | 47 | 31.2 | 39.60 | 29.9 | 1.4830 | 0.8604 | 841 |
| f | 220 | 6.1 | 18 | 40 | 36.0 | 33.85 | 34.6 | 1.4850 | 0.8627 | 506 |
| g | 240 | 6.3– 6.2 | 17 | 43 | 41.2 | 36.85 | 39.7 | 1.4864 | 0.8645 | 532 |
| h | 260 | 6.6– 6.7 | 16 | 58 | 48.2 | 50.25 | 46.7 | 1.4878 | 0.8675 | 541 |
| i | 280 | 7.2– 7.5 | 14 | 72 | 57.0 | 60.40 | 55.0 | 1.4900 | 0.8706 | 693 |
| j | 300 | 8.5– 8.8 | 12 | 56 | 64.0 | 49.40 | 62.0 | 1.4930 | 0.8766 | 705 |
| k | 320 | 11.0–11.9 | 10 | 45 | 69.5 | 39.30 | 67.5 | 1.4962 | 0.8807 | 805 |
| Residue | | | | 234 | (97.7) | 210.00 | (96.5) | 1.5021 | 0.8946 | 1,098 |
| Loss, 3.5 wt. percent chg | | | | | | 25.00 | | | | |

[1] Benzene cryoscopic determination of molecular weight.

Comparisons are made with prior art products to show the unusual nature of the improvements thus obtained.

EXAMPLE I

This example is based upon an experimental procedure which demonstrates the improved process in accordance with my invention.

A 3-liter, 3-necked, flask was equipped with a heating mantle, thermometer, stirrer, dropping funnel, and two reflux condensers mounted in series. The lower condenser was of the bulb type, two feet in length and packed with glass helices; the upper condenser was an unfilled 18-inch bulb type. Ice-cooled tap water was fed into the jacket of the upper condenser, from which it then flowed through the jacket of the lower condenser. The vapor outlet of this condenser system passed through a Kjeldahl bulb and through an ice water cold tap; the vapor outlet from the latter passed into a receiver immersed in a Dry Ice-acetone mixture. The outlet of this reeciver passed through a bubbler containing a measured amount of aqueous sodium hydroxide.

The above reactor was charged with 468 grams (6 moles) of practical grade benzene and 60 grams (0.45 mole) anhydrous aluminum chloride. The temperature was brought to 50° C. and the benzene was alkylated by adding 1300 grams (6 gram-atoms chlorine) chlorinated wax during 4 hours with stirring. Copious evolution of hydrogen chloride occurs throughout the reaction. The alkylating agent had been prepared by reacting a paraffin wax having 24 carbon atoms with chlorine until it contained 16.4 weight per cent chlorine corresponding to 1.85 atoms chlorine per mole of the hydrocarbon.

At this point in the process, 35 grams of benzene were added to the reaction mixture to make up for this amount carried past the reflux condenser into the vapor recovery system.

The temperature of the reaction mixture was then

Curve I of the drawing shows refractive index values of the above product fractions, plotted versus volume per cent over; these values were taken from Table I above.

The foregoing process and alkylate product are exemplary of the improvements I secure from the practice of my invention. The nature of the improvements will be seen by comparison with the following Examples II and III concerned with undesirable process conditions and prior art procedures.

EXAMPLE II

This example demonstrates the undesirable result obtained when the essential proportioning of the alkylation components is not maintained, such as not compensating for loss of the volatile aromatic by vaporization from the alkylation zone. In this run, the reactor of Example I was used with a condenser system which ordinarily is considered adequate. It consisted of a glass 18-inch unpacked bulbular tube type reflux condenser having a water cooling jacket; tap water was used for cooling. The vapor outlet of this condenser passed through a Dry Ice-acetone cold trap and then to atmospheric waste disposal.

The above reactor was charged with 468 grams (6 moles) of practical grade benzene and 60 grams (0.45 mole) anhydrous aluminum chloride. The charge mixture was warmed to 60° C., and then 1300 grams of 16.4 percent chlorowax (containing 6 gram atoms chlorine), described further in Example I, were added dropwise with stirring during a two-hour period. Hydrogen chloride was rapidly evolved.

The alkylation was further continued by raising the reaction temperature to about 90° C. adding another 1300 grams of the chlorowax with stirring in two hours. The rapid evolution of hydrogen chloride continued. The Dry Ice trap contained about 100 grams (1.3 moles)

of benzene which had vaporized from the reaction in this time; none was added back to the reaction mixture to compensate this loss therefrom.

The reaction mixture was stirred for three hours more at 90° C. and was let stand over night under continued mild heating. By this time, the aluminum chloride sludge, amounting to 310 grams, had settled out and the alkylate product was drawn off amounting to 2222 grams.

The physical propertis of the molecularly distilled fractions of the crude alkylate and conditions of the distillation are shown below in Table II. The centrifugal still used is identified in Example I.

Then there was added dropwise 1300 grams (containing 6 gram atoms chlorine) of 16.4 per cent chlorowax described in Example I during a period of 4 hours. Hydrogen chloride was rapidly evolved.

The reflux condenser was then rearranged for distilling off excess benzene which required raising the temperature to 115° C. to complete stripping it therefrom; 503 grams of benzene were thus recovered.

The condenser was returned to reflux position, the stripped reaction mixture was cooled to about 85° C., and another 1300 grams of the chlorowax were added dropwise over a period of 2½ hours, after which the reaction mixture was held at 90° C. for three more hours. On Table II.—Molecular distillation of alkylate

| | Dist. Temp., °C. | Distillation Pressure (microns) | Fraction Time, Min. | Volume | | Refractive Index, $n_D^{30}$ | Mol. Wt.[1] |
|---|---|---|---|---|---|---|---|
| | | | | Fraction, Ml. | Cumulative, Vol. percent Over | | |
| Charged to Still | | | | 151 (129 grams) | | 1.4811 | 543 |
| Still Fractions: | | | | | | | |
| a | 120 | 6.8–6.0 | 8 | 16.0 | 10.6 | 1.4498 | |
| b | 140 | 5.8–7.5 | 7 | 12.0 | 18.5 | | 374 |
| c | 160 | 5.2–5.0 | 5 | 13.0 | 27.2 | 1.4703 | |
| d | 180 | 4.9–4.8 | 5 | 11.0 | 34.4 | | |
| e | 200 | 4.7–4.5 | 4 | 6.5 | 38.8 | 1.4799 | |
| f | 220 | 4.5 | 4 | 5.0 | 42.0 | | |
| g | 240 | 4.5–4.6 | 4 | 7.5 | 47.1 | 1.4824 | |
| h | 260 | 4.6–4.8 | 3 | 12.0 | 54.9 | | |
| i | 280 | 4.8 | 3 | 13.0 | 63.5 | 1.4856 | |
| j | 300 | 5.5 | 2 | 7.5 | 68.6 | | |
| k | 320 | 6.5 | 1.5 | 4.5 | 71.6 | 1.4896 | 743 |
| Residue | | | | 25.0 | (88.1) | | |
| Loss, 11.9 vol. percent chg. | | | | | | | |

[1] Benzene cryoscopic method for molecular weight.

Curve II of the drawing was plotted from the refractive index and fraction over data given in the above Table II. Compare this with the product of Example I and note while proportioning of reactants is initially the same, the product is markedly inferior when the loss of volatile aromatic from the reaction is not compensated for.

EXAMPLE III

This example demonstrates particularly the practice of the prior art, wherein an excess of the volatile aromatic reactant is used in the alkylation process.

A 5-liter, 3-necked, flask equipped as for Example II, omitting the Dry Ice trap on vapor exhaust from the reflux condenser, was charged with 936 grams (12 moles) of required and excess practical grade benzene, and 60 grams (0.45 mole) anhydrous aluminum chloride. This charge was mixed and warmed to 60° C.

standing overnight at about 80° C., catalyst sludge amounting to 509 grams settled out, and 2088 grams of the crude alkylate product were drained off.

The physical properties of the fractions obtained by molecular distillation (apparatus identified in Example I) of this crude wax substituted benzene alkylate and the conditions of distillation are given in the following Table III. Curve III of the drawing is based upon the refractive index and per cent over data listed in this table.

Table III.—Molecular distillation of alkylate

| | Dist. Temp., °C. | Distillation Pressure (microns) | Fraction Time, Min. | Volume | | Refractive Index, $n_D^{30}$ | Mol. Wt.[1] |
|---|---|---|---|---|---|---|---|
| | | | | Fraction, Ml. | Cumulative, Vol. percent Over | | |
| Charged to Still | | | | 173 (146 grams) | | 1.4748 | 494 |
| Still Fractions: | | | | | | | |
| a | 120 | 5.8–8.2 | 10 | 21 | 12.1 | 1.4460 | |
| b | 140 | 6.0–5.8 | 10 | 17.5 | 22.2 | | 351 |
| c | 160 | 5.8 | 8 | 14.0 | 30.2 | 1.4590 | |
| d | 180 | 5.8 | 7 | 16.0 | 39.6 | | |
| e | 200 | 5.0–4.9 | 5 | 12.5 | 46.8 | 1.4708 | |
| f | 220 | 6.0–6.2 | 5 | 8.5 | 51.7 | | |
| g | 240 | 4.7 | 4 | 8.5 | 56.5 | 1.4812 | |
| h | 260 | 5.2 | 3 | 14.5 | 65.0 | | |
| i | 280 | 5.1 | 3 | 13.0 | 72.5 | 1.4868 | |
| j | 300 | 6.8 | 1 | 7.5 | 77.0 | | |
| k | 320 | 6.9–7.1 | 1 | 6.0 | 80.3 | 1.4902 | 696 |
| Residue | | | | 8.0 | (84.9) | | |
| Loss, 15.1 Vol. percent Chg. | | | | | | | |

[1] Benzene cryoscopic method for molecular weight.

Compare now the three curves in the drawing. It is evident that an alkylate produced according to my invention is physically quite different (curve I) from prior art product, (curve III) produced from the same raw materials. It is also emphasized here, as I have previously shown, that it is essential to have dialkylating equivalents of the alkylating and aromatic components. No excess of the aromatic reactant is used, and unless compensation is made for its vaporization loss in the process, then an inferior alkylate product (curve II) cannot be avoided.

Particularly pertinent data from the foregoing examples are summarized and compared in the following Table IV.

Table IV.—Properties of alkylates from Examples I–III

| | I | II | III |
|---|---|---|---|
| Property of Alkylate: | | | |
| Molecular Weight | 614 | 543 | 494 |
| Density, $d_4^{27}$ | 0.8679 | 0.8564 | 0.8435 |
| Refractive Index, $n_D^{30}$ | 1.4882 | 1.4811 | 1.4748 |
| Molecular Distillation: | | | |
| Vol. percent over @ 120° C | 4.3 | 10.6 | 12.1 |
| Vol. percent over @ 320° C | 69.5 | 71.6 | 80.3 |
| Mol. Wt. of 320° C. Fraction | 805 | 743 | 696 |

Thus it is clearly evident that I have produced an alkylate markedly improved with respect to its several physical properties as shown (column I) in the above Table IV.

I have prepared numerous wax substituted benzene alkylates according to each of Examples I, II, and III for checking the molecular weights of these alkylates. This was done to verify the existence of very real differences in the various alkylates, since the benzene cryoscopic determination is subject to considerable variation on any given complex high molecular weight alkylate. My findings are summed up in the following Table V.

Table V.—Molecular weight according to alkylate type

Type: Mol. wt.
Example I _____ 615±18
Example II _____ 535±16
Example III _____ 490±15

Thus it will be seen that the wax-benzene alkylate produced according to my improved process, Example I above, is characterized by a molecular weight completely outside of the range of previously known products produced from the same raw materials.

This product improvement is further supported by experimental work, wherein I varied the proportions of chlorowax (16.4 per cent Cl) and benzene in the alkylation. The pertinent results are summarized in the following Table VI.

Table VI.—Effect of reactant proportioning

| Run No. | 1 | 2 | 3 | 4 | 5 |
|---|---|---|---|---|---|
| Benzene, moles | 0.8 | 1 | 1.6 | 4 | 12 |
| Chlorowax, as Gram Atoms Cl | 2 | 2 | 2 | 2 | 2 |
| Mol. Wt. of Product | 535 | 615 | 484 | 426 | 437 |

The foregoing alkylation runs were made at about 50° C. and finished at about 90° C. The catalyst sludge was settled out overnight and the alkylate products were drawn off. Excess benzene was distilled from the products of runs 3, 4, and 5. Run 2, representative of my invention, was conducted with compensation for vapor-lost benzene. Run 1, starting out with one mole of benzene finished with about 0.8 mole since the recovered vapor-lost benzene was not put back into the reaction.

Note now the molecular weight of 615 for the alkylate of run 2. It is remarkably anomalous to the lower molecular weights obtained when the proportions of reactants are shifted either way from that shown in run 2, i. e., two chloro-gram-atoms of alkylating agent per mole of aromatic hydrocarbon. Had the excess benzene been distilled in the presence of the catalyst from the products of runs 3, 4, and 5 according to the prior art, even greater disparity in the molecular weights would occur.

The benzene-free alkylates of runs 3, 4, and 5 may be approximately described as monowaxbenzenes. All attempts to further alkylate such once formed and isolated monalkyl products using fresh catalyst have failed to approach the molecular weight obtainable by the "once-through" process under the conditions of run 2, Examples I, IV, and elsewhere described herein. For example, a monalkylate produced as in run 5 was further reacted to produce the dialkylate; the molecular weight of the product of this interrupted process was only 544.

Examples IV–VI given hereinafter are in further accord with my invention.

EXAMPLE IV.—SEMICOMMERCIAL PREPARATION OF IMPROVED WAX SUBSTITUTED BENZENE

A reaction kettle of 300-gallon capacity was connected by means of pipe through a check valve to a swing line extending to the bottom of a second kettle of equal capacity which was utilized as an absorber. The second kettle was fitted with a distillation condenser and receiver. Two hundred pounds of commercial flake sodium hydroxide and 1500 pounds of water were charged into the absorber and warmed to about 170° F. (77° C.).

One hundred fifty-six pounds of practical grade benzene (2 pound moles, 21.2 gallons), and 20 pounds of commercial anhydrous aluminum chloride were weighed into the reactor. This charge mixture was stirred and warmed to 130° F.±10° F. (49–60° C.) with rapid agitation. Then 868 pounds of polychlorwax (16.39 per cent chlorine, 4 pound atoms chlorine, 119.3 gallons) were pumped into the reactor over a 4-hour period. After one half of the polychlorwax had been added, the reaction temperature was increased to 175° F.±10° F. (74–85° C.) and maintained there during the remainder of polychlorwax addition and during the subsequent 4 to 8 hours stirring. The aqueous alkali in the absorber was maintained at 190 F.±10° F. (82–93° C.) by means of cooling, and benzene vapors evolved smoothly from the liquid surface. This benzene was condensed and measured and an equal amount of fresh benzene replaced in the reaction zone through the polychlorwax addition line. A total of 36 pounds of benzene was replaced in the reaction zone.

After completion of polychlorwax addititon and subsequently stirring for 8 hours, agitation was stopped and the reaction mixture was left standing at 175° F.±20° F. (68–91° C.) overnight. Catalyst sludge was then withdrawn from the bottom of the reactor, and 782 pounds of wax substituted benzene alkylate was obtained. It was similar in all respects to the alkylate obtained in Example I.

EXAMPLE V

A chlorowax consisting principally of monochlorowax, mol. wt. 386 and containing 9.74 weight per cent Cl, was obtained by fractionally crystallizing a chlorinated paraffin wax containing 16.4 per cent Cl. The solvent medium was methyl-ethyl ketone. The chlorinated wax was twice recrystallized and the fraction obtained between −2.2 and −20° C. was the desired monochlorowax alkylating agent. A somewhat similar alkylating agent may also be obtained by controlling the chlorination of paraffin wax to the monochlorine content of 9.74 per cent.

An apparatus constructed as in Example I was charged with 147 grams (1.89 moles) practical benzene and 30 grams (0.22 mole) anhydrous aluminum chloride. After stirring and warming this mixture to 50° C., 675 grams of the above monochlorowax containing 1.85 gram atoms of chlorine were added in dropwise with stirring during 1.5 hours. Hydrogen chloride was evolved rapidly.

At this point in the process, 8 grams of benzene were added to the reaction to make up for vaporization loss therefrom.

The reaction was raised to 85° C. and dropwise addition of 675 grams more of the monochlorowax was completed during 1½ hours, after which the reaction mixture was stirred 6 hours at 85° C. The reaction mixture was let stand overnight at 90° C. whereupon the catalyst sludge had settled out.

The reaction mixture weighed 1379 grams (1388 grams, theory); of the evolved hydrogen chloride, 3.1 moles were accounted for in the tail gas absorber. The alkylate product, free of catalyst sludge, was slurried with attapulgas clay at 90° C. for 10 minutes and filtered; 1011 grams of a predominantly diwax substituted benzene alkylate were obtained having a molecular weight of 581.

EXAMPLE VI.—ALKYLATION OF TOLUENE

A 5-liter, 3-necked, Pyrex reaction flask, equipped as described in Example I, was charged with 644 grams (7 moles) of dry toluene and 30 grams (0.22 mole) commercial grade anhydrous aluminum chloride catalyst. When this charge had been stirred and warmed to 50° C., 3314 grams of chlorinated paraffin wax (containing 15 weight per cent chlorine, 14 gram atoms thereof) was added dropwise during 4.5 hours while keeping the temperature of the entire process between 50 and 60° C. Hydrogen chloride was rapidly evolved from the reaction.

At the midpoint of the process, 15 grams of toluene to make up vaporization loss were added to the reacting mixture along with 10 grams of catalyst to offset the effects of impurities in the reactants. After completion of the chlorowax addition, another 10 grams of the catalyst was added and stirring at 55° C. continued for 4 hours.

The reaction mixture was then blown with nitrogen for 30 minutes to remove evolved hydrogen chloride into its absorption trap. The vapor recovery system contained 17 grams toluene and 486 grams hydrogen chloride.

The reaction mixture was let stand overnight at a temperature not above about 100° C. The catalyst sludge had settled out amounting to 169 grams, and 3,245 grams of the crude wax substituted toluene alkylate was withdrawn therefrom. The crude product was clarified by slurrying it with 10 per cent by weight of attapulgas clay at 90° C. for 10 minutes and then filtering out the clay.

*Analysis.*—Molecular weight 565 and 0.63 per cent Cl.

SULFONATION OF ALKYLATED AROMATIC PRODUCTS

The foregoing alkylates may be sulfonated when utilizing them as intermediates, for example, in the production of oil soluble surface active agents.

The alkylates prepared in accordance with the process of this invention are as readily sulfonated if not more so than the related prior art products; however, those alkylates which are produced in the absence of compensated proportioning of the volatile aromatic hydrocarbon component, such as produced in Example II, form stable emulsions difficult to break when the sulfonation mixtures are quenched with water.

The concluding examples of this specification which follow are concerned with the preparation of the alkaryl sulfonates and the metal salt surface active products thereof.

EXAMPLE VII.—SULFONATION OF WAX SUBSTITUTED BENZENE

Six hundred grams of a wax substituted benzene alkylate produced according to Example I and clarified by contacting with Attapulgas clay were dissolved in 600 grams of 170 pale oil with 200 grams of 25 per cent oleum. This mixture was stirred at about 46° C. for 2 hours, at which time the sulfonation reaction was judged to be completed.

The reacted mixture was quenched by stirring with 300 grams water and then let stand overnight at 100° C. A sharp separation of spent acid and organic layers took place. The sulfonated alkylate in oil solution thus obtained amounted to 1279 grams and was found to contain 0.622 milli-equivalents of the sulfonic acid grouping per gram of product.

The calcium salt of the above sulfonic acid was then prepared by treating 250 grams of it with 9 grams (50 per cent excess) calcium hydroxide and 2 grams of water. The resulting mixture was stirred with heating at 100° C. for 3 hours. It was then dehydrated by raising the temperature to 170° C. during one hour. The reaction product was filtered through diatomaceous earth.

Analysis of calcium wax substituted benzene sulfonate in oil solution thus produced showed, 1.4 per cent sulfur and a base number equivalent to 3.74 m. eq. KOH per gram. It was found to be a useful detergent in an engine lubricating oil composition.

EXAMPLE VIII.—SULFONATION OF WAX SUBSTITUTED TOLUENE

Thirteen hundred grams of the wax substituted toluene alkylate of Example VI was sulfonated by dissolving it in 1300 grams of 170 pale oil and adding 650 grams of 30–33 per cent oleum to it dropwise with stirring during 30 minutes starting at 35° C. During the reaction, the temperature rose to 57° C. After adding the oleum, the reaction mixture was stirred for one hour; the temperature thereby decreased to 42° C.

The reaction mixture was then quenched by stirring in 325 grams of water. The resulting emulsion, heated to 100° C. and let stand in the oven overnight, readily separated to form spent acid and organic product layers. The oil solution of wax substituted toluene-sulfonic acid thus formed amounted to 2800 grams. It contained 0.83 milliequivalent of the sulfonic acid grouping per gram.

The barium salt of the foregoing sulfonic acid was prepared by heating 1000 grams of it with 100 grams of water to 100° C., and while stirring adding 140.6 grams (120 per cent excess) of barium oxide in 20-gram increments during about 10 minutes. The resulting mixture was stirred 4 hours, keeping it heated under water reflux. The reaction mixture was then dehydrated by steaming off the water to a final temperature of 170° C. Filtering the dehydrated mixture through diatomaceous earth gave 920 grams of a homogeneous oil blend of the barium wax substituted toluene-sulfonate. Analysis: 10.3 per cent Ba, 2.1 per cent S, and Base No. 32.5.

The barium salt was found useful as a detergent in a lubricating oil composition.

Having thus described and exemplified the practice of my invention, I do not wish to be unduly limited thereby other than as set forth by the terms of the claims which follow.

I claim:

1. The method of preparing alkyl substituted aromatic hydrocarbons which comprises bringing together and slowly reacting within a reaction vessel in the presence of a metal halide Friedel-Crafts catalyst and under mild alkylating conditions above about 50° C. but not exceeding about 100° C., a volatile aromatic hydrocarbon having a boiling point below about 125° C. and a chlorinated aliphatic hydrocarbon of about 18 to 30 carbon atoms which is a liquid at 125° C., the reactants being brought together in relative proportions of about two chlorine gram equivalents of the chlorinated hydrocarbon to each mole of aromatic hydrocarbon maintaining the concentration of the reactants in approximately the same relative proportion throughout the reaction, maintaining the reaction mass at all times in the range from about 50 to not more than 100° C., without distillative fractionation finishing off the product by maintaining the mass for several hours at an elevated temperature not in excess of about 100° C. until the metal halide sludge has settled out and then separating the alkylate product from the catalyst sludge.

2. The method of preparing alkyl substituted aromatic hydrocarbons which comprises bringing together and reacting over a period of at least one hour an aromatic hydrocarbon, the boiling point of which is not higher than 125° C., a chlorinated aliphatic hydrocarbon of about 18 to 30 carbon atoms which is a liquid at 125° C. and a metal halide Friedel-Crafts type catalyst, the reactants being brought together in relative proportions of about two chlorine gram equivalents of the chlorinated hydrocarbon to each gram mole of aromatic hydrocarbon maintaining the concentration of the reactants in approximately the same relative proportion throughout the reaction, maintaining the reaction mass at all times in the range from about 50 to not more than 100° C., without distillative fractionation finishing off the product by maintaining the mass at an elevated temperature not in excess of about 100° C. until the metal halide sludge has settled out and then separating such sludge from the alkylate product.

3. The method of preparing alkyl substituted aromatic hydrocarbons which comprises bringing together at a substantially uniform rate over a period of at least one hour an aromatic hydrocarbon having a boiling point below about 125° C., a chlorinated aliphatic hydrocarbon of about 18 to 30 carbon atoms which is a liquid at 125° C., and a metal halide Friedel-Crafts type catalyst, in substantially the proportions of about two chlorine gram-equivalents of the chlorinated hydrocarbon to each gram mole of the aromatic hydrocarbon maintaining the concentration of the reactants in approximately the same relative proportion throughout the reaction, maintaining the reaction mass at all times in the range from about 50 to not more than 100° C., without distillative fractionation finishing off the product by maintaining the mass for several hours at an elevated temperature not in excess of about 100° C. until the catalyst sludge has settled out and separating the alkylate product from the sludge.

4. The method of preparing alkyl substituted aromatic hydrocarbons which comprises bringing together at a substantially uniform rate over a period of at least one hour an aromatic hydrocarbon, the boiling point of which is not higher than 125° C., a predominantly mono-chlorinated aliphatic hydrocarbon of about 18 to 30 carbon atoms which is a liquid at 125° C. and a metal halide Friedel-Crafts type catalyst, in relative proportions substantially equal to the stoichiometric amounts required for the production of an end product having an average of two alkyl groups per aromatic nucleus maintaining the concentration of the reactants in approximately the same relative proportion throughout the reaction, maintaining the reaction mass at all times in the range from about 50 to not more than 100° C., without distillative fractionation finishing off the product by maintaining the mass at an elevated temperature not in excess of about 100° C. until the metal halide sludge has settled out and then separating such sludge from the alkylate product.

5. The method of preparing wax substituted aromatic hydrocarbons which comprises charging a reaction vessel with a volatile aromatic hydrocarbon having a boiling point not higher than 125° C. and a metal halide Friedel-Crafts catalyst, heating the charged reactor to about 50 to 60° C., slowly and progressively adding to the reactor a predominantly mono-chlorinated wax hydrocarbon alkylating agent of about 18 to 30 carbon atoms which is liquid at 125° C. in a relative proportion substantially equal to the stoichiometric amount required for the production of an end product having an average of two alkyl groups to each aromatic nucleus and progressively adding aromatic hydrocarbon in amounts sufficient to replace that lost through hydrogen chloride evolution, maintaining the reactor during the addition at a temperature not exceeding about 90° C., heat-soaking the reaction mass at a temperature below about 100° C. for several hours until the metal halide sludge has settled out and withdrawing the alkylate product from the alkylate sludge.

6. The method of preparing wax substituted aromatic hydrocarbons which comprises charging a reaction vessel with a volatile aromatic hydrocarbon having a boiling point not higher than 125° C. and a metal halide Friedel-Crafts catalyst, heating the charged reactor to about 50 to 60° C., slowly and progressively adding to the reactor a chlorinated wax hydrocarbon alkylating agent of about 18 to 30 carbon atoms which is liquid at 125° C. in the proportion of about two chlorine gram-equivalents of the chlorinated wax hydrocarbon to each gram mole of aromatic hydrocarbon and progressively adding aromatic hydrocarbon to the reactor in amounts only sufficient to replace that lost through hydrogen chloride evolution, maintaining the reactor during the addition at a temperature not exceeding about 90° C., heat-soaking the reaction mass at a temperature below about 100° C. for several hours until the metal halide sludge has settled out and withdrawing the alkylate product from the catalyst sludge.

7. The method of preparing wax substituted aromatic hydrocarbons which comprises charging a reaction vessel with a volatile aromatic hydrocarbon having a boiling point below about 125° C. and a metal halide Friedel-Crafts catalyst, heating the charged reactor to about 50–60° C., slowly adding a first portion of a chlorinated wax hydrocarbon alkylating agent of about 18 to 30 carbon atoms which is liquid at 125° C. in the proportion of about one chlorine gram-equivalent of the chlorinated wax hydrocarbon to each gram mole of aromatic hydrocarbon, replacing the aromatic hydrocarbon lost through volatilization and hydrogen chloride evolution, maintaining the reactor at a temperature not exceeding about 90° C., slowly adding a second portion of the alkylating agent in the proportion of about one chlorine gram-equivalent of the chlorinated wax hydrocarbon to each gram mole of aromatic hydrocarbon, replacing the aromatic hydrocarbon lost during the second stage of alkylation, heat-soaking the reaction mass for several hours at a temperature below about 100° C., until the metal halide sludge has settled out and withdrawing the alkylate product from the catalyst sludge.

8. The method of preparing wax substituted aromatic hydrocarbons which comprises charging a reaction vessel with a volatile aromatic hydrocarbon having a boiling point below about 125° C. and a metal halide Friedel-Crafts catalyst, heating the charged reactor to about 50 to 60° C., slowly adding a first portion of a predominantly mono-chlorinated wax hydrocarbon alkylating agent of about 18 to 30 carbon atoms which is a liquid at 125° C. in a relative proportion substantially equal to one-half of the stoichiometric amount required for the production of an end product having an average of two alkyl groups to each aromatic nucleus, replacing the aromatic hydrocarbon lost through vaporization and hydrogen chloride evolution, maintaining the reactor at a temperature not exceeding about 90° C., slowly adding a second portion of the mono-chlorinated alkylating agent substantially equal to the first portion, replacing the aromatic hydrocarbon lost during the second stage of alkylation, heat soaking the reaction mass for several hours at a temperature below about 100° C. until the metal halide slude has settled out and withdrawing the alkylate product from the catalyst sludge.

9. The method of preparing wax substituted benzene which comprises charging a reaction vessel with benzene and anhydrous aluminum chloride, heating the charged reactor to about 50–60° C., slowly adding a first portion of a chlorinated wax hydrocarbon alkylating agent of 18 to 30 carbon atoms which is a liquid at 125° C. in the proportion of about one chlorine gram-equivalent of the chlorinated wax hydrocarbon to each gram mole of benzene, replacing the benzene lost through vaporization and hydrogen chloride evolution, maintaining the reactor at a temperature not exceeding about 90° C., slowly adding a second portion of the alkylating agent in the proportion of about one chlorine gram-equivalent of the chlorinated wax hydrocarbon to each gram mole of benzene, replacing the benzene lost during the second stage of alkylation, heat-soaking the reaction mass for several hours at a temperature below about 100° C. until the aluminum chloride sludge has settled out and withdrawing the wax substituted benzene from the catalyst sludge.

10. The method of preparing wax substituted toluene which comprises charging a reaction vessel with toluene and anhydrous aluminum chloride, heating the charged reactor to about 50–60° C., slowly adding a first portion of a chlorinated wax hydrocarbon alkylating agent of 18 to 30 carbon atoms which is liquid at 125° C. in the proportion of about one chlorine gram-equivalent of the chlorinated wax hydrocarbon to each gram mole of toluene, replacing the toluene lost through vaporization and hydrogen chloride evolution, maintaining the reactor at a temperature not exceeding about 90° C., slowly adding a second portion of the alkylating agent in the proportion of about one chlorine gram-equivalent of the chlorinated wax hydrocarbon to each gram mole of toluene, replacing the toluene lost during the second stage of alkylation, heat-soaking the reaction mass for several hours at a temperature below about 100° C. until the aluminum chloride sludge has settled out and withdrawing the wax substituted toluene from the catalyst sludge.

11. The method of preparing wax substituted aromatic hydrocarbons which comprises charging a reaction vessel with a volatile aromatic hydrocarbon having a boiling point below about 125° C. and a metal halide Friedel-Crafts catalyst, heating the charged reactor to about 50 to 60° C., slowly adding a chlorinated wax hydrocarbon alkylating agent of 18 to 30 carbon atoms which is a liquid at 125° C. in the proportion of about two chlorine gram-equivalents of the chlorinated wax hydrocarbon to each gram mole of aromatic hydrocarbon, simultaneously therewith replacing the aromatic hydrocarbon lost through vaporization and hydrogen chloride evolution and maintaining the reactor during the addition at a temperature not exceeding about 90° C., heat-soaking the reaction mass for several hours at a temperature below 100° C., until the metal halide sludge has settled out and withdrawing the alkylate product from the catalyst sludge.

12. The method of preparing wax substituted aromatic hydrocarbons which comprises charging a reaction vessel with a volatile aromatic hydrocarbon having a boiling point below about 125° C. and a metal halide Friedel-Crafts catalyst, heating the charged reactor to about 50 to 60° C., slowly adding a predominantly mono-chlorinated wax hydrocarbon of 18 to 30 carbon atoms which is a liquid at 125° C. in a relative proportion substantially equal to the stoichiometric amount required for the production of an end product having an average of two alkyl groups to each aromatic nucleus, simultaneously therewith replacing the aromatic hydrocarbon lost through vaporization and hydrogen chloride evolution and maintaining the reactor during the addition at a temperature not exceeding about 90° C., heat-soaking the reaction mass for several hours at a temperature below about 100° C. until the metal halide sludge has settled out and withdrawing the alkylate product from the catalyst sludge.

13. The method of preparing wax substituted benzene which comprises charging a reaction vessel with benzene and anhydrous aluminum chloride, heating the charged reactor to about 50 to 60° C., slowly adding a chlorinated wax hydrocarbon alkylating agent of 18 to 30 carbon atoms which is a liquid at 125° C. in the proportion of about two chlorine gram-equivalents of the chlorinated wax hydrocarbon to each gram mole of benzene, simultaneously therewith replacing the benzene lost through vaporization and hydrogen chloride evolution and maintaining the reactor during the addition at a temperature not exceeding about 90° C., heat-soaking the reaction mass for several hours at a temperature below about 100° C. until the aluminum chloride sludge has settled out, and withdrawing the wax substituted benzene from the catalyst sludge.

14. The method of preparing wax substituted toluene which comprises charging a reaction vessel with toluene and anhydrous aluminum chloride, heating the charged reactor to about 50 to 60° C., slowly adding a chlorinated wax hydrocarbon alkylating agent of 18 to 30 carbon atoms which is a liquid at 125° C. in the proportion of about two chlorine gram-equivalents of the chlorinated wax hydrocarbon to each gram mole of toluene, simultaneously therewith replacing the toluene lost through vaporization and hydrogen chloride evolution and maintaining the reactor during the addition at a temperature not exceeding about 90° C., heat-soaking the reaction mass for several hours at a temperature below about 100° C. until the aluminum chloride sludge has settled out, and withdrawing the wax substituted toluene from the catalyst sludge.

15. A method of preparing wax substituted aromatic hydrocarbons which comprises charging a reaction vessel with a volatile aromatic hydrocarbon having a boiling point below about 125° C. and a metal halide Friedel-Crafts catalyst, heating the charged ractor to about 50 to 60° C., slowly adding a chlorinated wax hydrocarbon alkylating agent of 18 to 30 carbon atoms which is a liquid at 125° C. until the alkylating agent is present in the proportion of about two chlorine gram-equivalents of the chlorinated wax hydrocarbon to each gram mole of aromatic nuclei remaining in the reaction vessel and maintaining the temperature of the reactor during the addition at a temperature not exceeding about 90° C., heat-soaking the reaction mass for several hours at a temperature below about 100° C., until the metal halide sludge has settled out and withdrawing the alkylate product from the catalyst sludge.

16. The method of preparing wax substituted benzene which comprises charging a reaction vessel with benzene and anhydrous aluminum chloride, heating the charged reactor to about 50 to 60° C., slowly adding a chlorinated wax hydrocarbon alkylating agent of 18 to 30 carbon atoms which is a liquid at 125° C. until the alkylating agent is present in the proportion of about two chlorine gram-equivalents of the chlorinated wax hydrocarbon to each gram mole of benzene nuclei remaining in the reaction vessel and maintaining the temperature of the reactor during the addition at a temperature not exceeding about 90° C., heat-soaking the reaction mass for several hours at a temperature below about 100° C., until the aluminum chloride sludge has settled out and withdrawing the wax substituted benzene from the catalyst sludge.

17. The method of preparing wax substituted toluene which comprises charging a reaction vessel with toluene and anhydrous aluminum chloride, heating the charged reactor to about 50 to 60° C., slowly adding a chlorinated wax hydrocarbon alkylating agent of 18 to 30 carbon atoms which is a liquid at 125° C. until the alkylating agent is present in the proportion of about two chlorine gram-equivalents of the chlorinated wax hydrocarbon to each gram mole of toluene nuclei remaining in the reaction vessel and maintaining the temperature of the reactor during the addition at a temperature not exceeding about 90° C., heat-soaking the reaction mass for several hours at a temperature below about 100° C., until the aluminum chloride sludge has settled out and withdrawing the wax substituted toluene from the catalyst sludge.

18. The method of preparing wax substituted aromatic hydrocarbons which comprises charging a reaction vessel with a chlorinated wax hydrocarbon alkylating agent of 18 to 30 carbon atoms which is a liquid at 125° C. and a volatile aromatic hydrocarbon having a boiling point below about 125° C. in the proportions of about two chlorine gram-equivalents of the chlorinated wax hydrocarbon to each gram mole of aromatic hydrocarbon, heating the charged reactor to about 50 to 60° C., slowly adding a metal halide Friedel-Crafts catalyst to the reactor in the proportions of about 0.02 to 0.2 gram moles of metal halide to each gram mole of aromatic hydrocarbon, maintaining the reactor during the addition at a temperature not exceeding about 90° C., replacing the aromatic hydrocarbon lost through vaporization and hydrogen chloride evolution, heat-soaking the reaction mass at below about 100° C. for several hours, until the metal halide sludge has settled out and withdrawing the alkylate product from the catalyst sludge.

19. The method of preparing wax substituted benzene which comprises charging a reaction vessel with a chlorinated wax hydrocarbon alkylating agent of 18 to 30 carbon atoms which is a liquid at 125° C. and benzene in the proportions of about two chlorine gram-equivalents of the chlorinated wax hydrocarbon to each gram mole of benzene, heating the charged reactor to about 50 to 60° C., slowly adding anhydrous aluminum chloride to the reactor in the proportions of about 0.02 to 0.2 gram moles of aluminum chloride to each gram mole of benzene, maintaining the reactor during the addition at a temperature not exceeding about 90° C., replacing the benzene lost through vaporization and hydrogen chloride evolution, heat-soaking the reaction mass at below about 100° C. for several hours until the aluminum chloride sludge has settled out, and withdrawing the wax substituted benzene from the catalyst sludge.

20. The method of preparing wax substituted toluene which comprises charging a reaction vessel with a chlorinated wax hydrocarbon alkylating agent of 18 to 30 carbon atoms which is a liquid at 125° C. and toluene in the proportions of about two chlorine gram-equivalents of the chlorinated wax hydrocarbon to each gram mole of toluene, heating the charged reactor to about 50 to 60° C., slowly adding anhydrous aluminum chloride to the reactor in the proportions of about 0.02 to 0.2 gram moles of aluminum chloride to each gram mole of benzene, maintaining the reactor during the addition at a temperature not exceeding about 90° C., replacing the toluene lost through vaporization and hydrogen chloride evolution, heat-soaking the reaction mass at below about 100° C. for several hours until the aluminum chloride sludge has settled out, and withdrawing the wax substituted toluene from the catalyst sludge.

References Cited in the file of this patent

UNITED STATES PATENTS

| | | |
|---|---|---|
| 1,963,918 | MacLaren | June 19, 1934 |
| 2,015,748 | Frolich | Oct. 1, 1935 |
| 2,072,061 | Thomas | Feb. 23, 1937 |
| 2,223,364 | Flett | Dec. 3, 1940 |
| 2,247,365 | Flett | July 1, 1941 |
| 2,340,654 | Flett | Feb. 1, 1941 |
| 2,416,281 | Berger et al. | Feb. 25, 1947 |
| 2,437,356 | Hill | Mar. 9, 1948 |
| 2,443,082 | Reiff et al. | June 8, 1948 |